United States Patent [19]

Hamblin

[11] 3,728,441
[45] Apr. 17, 1973

[54] REMOVAL AND RECOVERY OF SULFUR FROM A GAS STREAM CONTAINING HYDROGEN SULFIDE

[75] Inventor: Robert J. J. Hamblin, Deerfield, Ill.

[73] Assignee: Universal Oil Products Company, Des Plaines, Ill.

[22] Filed: July 19, 1971

[21] Appl. No.: 163,844

Related U.S. Application Data

[63] Continuation-in-part of Ser. No. 802,356, Feb. 26, 1969, Pat. No. 3,594,125.

[52] U.S. Cl. .................................. 423/573, 423/220
[51] Int. Cl. ............................................. C01b 17/04
[58] Field of Search ..................... 23/181, 224, 225; 210/63

[56] References Cited

UNITED STATES PATENTS

| | | | |
|---|---|---|---|
| 3,365,374 | 1/1968 | Short et al. | 23/181 X |
| 3,457,046 | 7/1969 | Hoekstra | 23/224 |
| 3,627,470 | 12/1971 | Hamblin | 23/224 |

Primary Examiner—Oscar R. Vertiz
Assistant Examiner—George O. Peters
Attorney—James R. Hoatson, Jr. et al.

[57] ABSTRACT

$H_2S$ is removed from a gas stream and sulfur is produced by the steps of: (1) sequentially scrubbing the gas stream with a first recycle water stream containing $NH_4OH$ and then with a second recycle water stream which is sbustantially free of $NH_4OH$ to produce a treated gas stream which is reduced in $H_2S$ content and is substantially free of $NH_3$ and a bottom water stream containing $NH_4HS$; (2) catalytically treating the bottom water stream with an air stream to produce an effluent stream containing ammonium polysulfide; (3) treating the ammonium polysulfide-containing stream to recover sulfur and to produce a water stream which is substantially free of $NH_4OH$ and a water stream containing $NH_4OH$; and, (4) separately recycling at least a portion of these last two streams to the scrubbing step.

11 Claims, 1 Drawing Figure

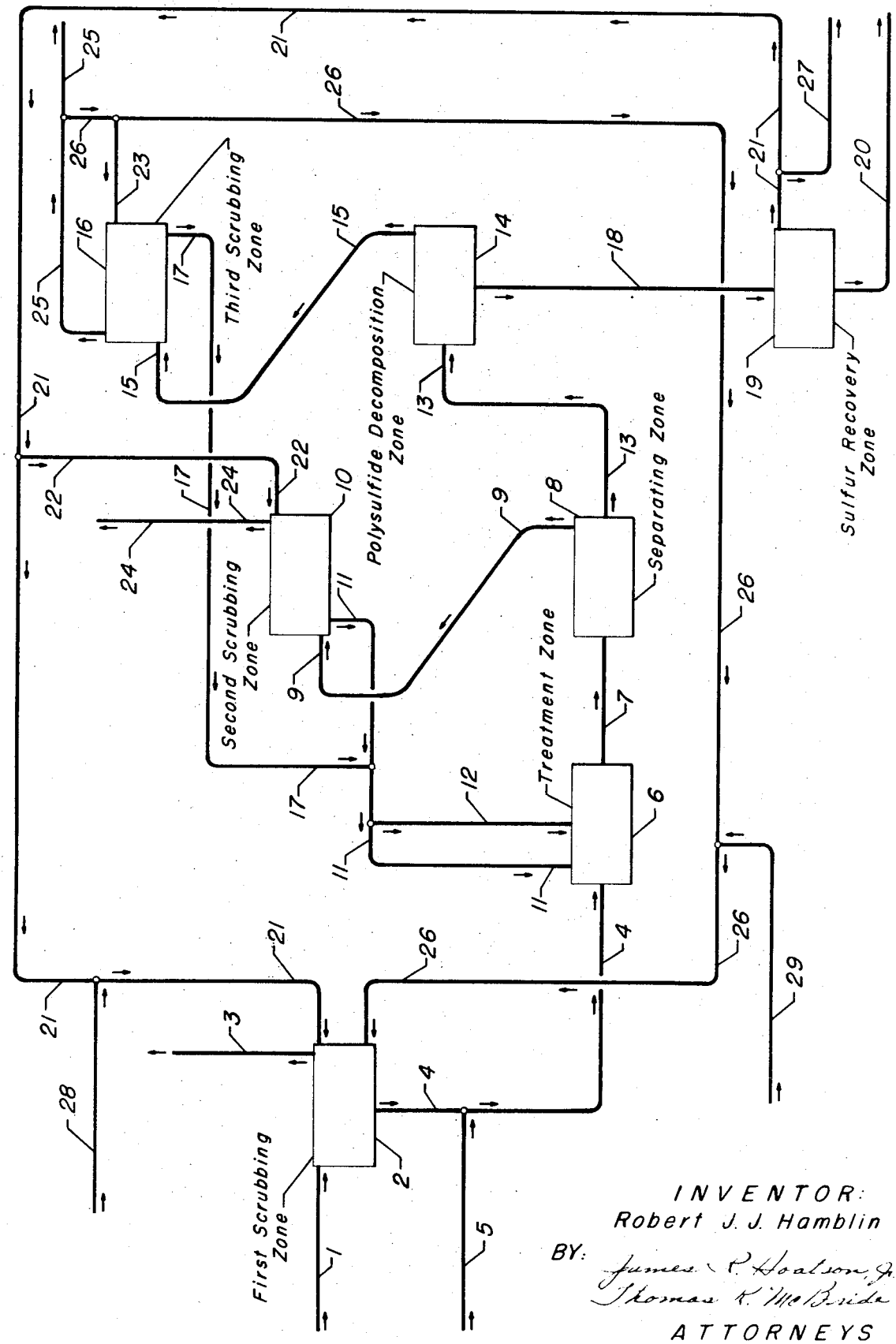

REMOVAL AND RECOVERY OF SULFUR FROM A GAS STREAM CONTAINING HYDROGEN SULFIDE

CROSS-REFERENCE TO RELATED APPLICATIONS

This application is a continuation-in-part of my prior, copending application, Ser. No. 802,356, which was filed on Feb. 26, 1969, now U.S. Pat. No. 3,594,125.

The subject of the present invention is a novel process for conveniently removing $H_2S$ from a gas stream sequentially scrubbing with an ammoniacal water stream and with an ammonia-free water stream without comtaminating the treated gas stream with $NH_3$ and for recovering elemental sulfur from the resulting rich absorbent stream with continuous regeneration of the two scrubbing streams. More precisely, the present invention is based on my finding of a convenient and simple method for treating a water stream containing $NH_4HS$ to produce elemental sulfur and two water streams: one containing $NH_4OH$ and one substantially free of $NH_4OH$, coupled with my recognition that a gas scrubbing step can be conveniently and simply interconnected with this treating method by means of these two water streams to enable the continuous scrubbing of a gas stream containing $H_2S$ without contaminating the treated gas stream with substantial amounts of $NH_3$.

The removal of $H_2S$ from a gas stream is a problem that has long confronted and challenged workers in many diverse industries. One example is in the natural gas industry where the $H_2S$ content of certain gas streams recovered from natural gas deposits in many areas of the world is often too high for commercial acceptance. Another example is in the manufactured gas industry of the coke-making industry where coal gas containing unacceptable amounts of $H_2S$ is commonly produced by the destructive distillation of bituminous coal having a high sulfur content. Yet another example is found in the manufacture of water gas or synthesis gas where it is not unusual to produce gas streams containing $H_2S$ by passing steam over a bed of incandescent coke or coal containing a minor amount of sulfur.

More frequently, this problem is encountered in the petroleum refining industry because the principal raw material used, crude oil, typically contains a minor amount of sulfur — principally in the form of organic sulfur compounds. During the course of the many processes to which the crude oil or fractions thereof are subjected, one or more gas streams containing $H_2S$ are quite commonly produced. For example, in many cases one of the product streams from a hydrocarbon conversion process is a gas stream containing $H_2S$ in admixture with light normally gaseous hydrocarbons — mainly, $C_1$–$C_3$ and/or with hydrogen. As is well known in the art, the presence of $H_2S$ in these refinery gas streams can cause a number of detrimental problems in subsequent processing steps such as: corrosion of process equipment, deterioration and deactivation of catalysts, undesired side reactions, increases in process pressure requirements, increase in gas compressor capacity, etc.

Regardless of the source of the gas stream containing $H_2S$, the problem of removing $H_2S$ therefrom has been solved in a number of different ways which generally involve one or more of the following techniques: selective absorption with a wide variety of absorbents, adsorption by a suitable adsorbent, selective reaction with a reagent which produces an easily separable product, etc. The details of these techniques are well known to those skilled in the art. One old and well known solution to this $H_2S$ removal problem involves scrubbing the gas stream with an ammoniacal aqueous solution. For example, in Germany the Perox process, which uses ammonia scrubbing, has been widely used for coal gas purification. Despite the considerable amount of effort that has been devoted to developing an acceptable solution to this problem involving scrubbing with an ammoniacal solution, the use of ammoniacal scrubbing has not been universally accepted in the gas treating art as the preferred method for removing $H_2S$ from a gas stream primarily because of a number of operational difficulties associated with its implementation. One difficulty involves the high partial pressure of ammonia which generally requires that the scrubbing step be conducted with relatively dilute ammonia solutions or at relatively high pressures. The use of dilute scrubbing solutions in turn quite commonly forces the addition of a separate water wash step after the ammonia scrubbing step in order to remove ammonia from the treated gas stream. In addition, the use of dilute scrubbing solutions typically increases substantially the regeneration costs where the regeneration step is conducted at a considerably higher temperature than the scrubbing step, although some of this heat load can be recovered by a suitable heat exchanging procedure. Another difficulty is associated with the regeneration of the rich absorbent solution withdrawn from the scrubbing step. In order to minimize the requirements of the scrubbing step for water and ammonia, it is necessary to remove sulfide from this rich absorbent solution. Several regeneration procedures have been proposed but they typically have involved the use of soluble catalysts such as hydroquinone and have had problems such as contamination of the sulfur product with the catalyst, excessive formation of side products such as ammonium sulfate and thiosulfate and loss of scrubbing solution and catalyst during the periodic purges that are generally required to remove side products from the system. Other difficulties have been associated with the recovery of the elemental sulfur from the regeneration step where it has been customary to form a froth of sulfur which then must be skimmed off and filtered. In short, it is clear that there are a significant number of technical problems associated with the prior art methods for removing $H_2S$ from a gas stream by the method of scrubbing with an ammoniacal solution.

As a result of my investigations of method of treating water streams containing $NH_4HS$, I have now formultaed a new approach to the use of ammonia scrubbing for the solution of this $H_2S$ removal problem which approach overcomes many of the difficulties experienced in the prior art. The basic concept of my approach involves the production in the regeneration section via a simple, economic procedure of two separate recycle water streams, one containing $NH_4OH$ and one substantially free of $NH_4OH$ and the interconnection of the $H_2S$-scrubbing step and the regeneration section by means of these two recycle streams in a matter that minimizes the amount of ammonia carried out of the system via the treated gas stream. More specifically, my solution to the problem involves the scrubbing of the sour gas stream with an ammoniacal solution and with a solution free of ammonia to form a rich absorbent solution containing $NH_4HS$ and the regeneration of this solution by first subjecting this stream to contact with a solid catalyst at conditions resulting in the formation of ammonium polysulfide followed by the subsequent decomposition of the ammonium polysulfide-containing stream to recover sulfur and to produce the two recycle water streams. Some of the advantages associated with my solution of this $H_2S$ removal problem are: (1) the sulfur recovered is not contaminated with detrimental salts; (2) the ammonia loss from the system is held to low levels; (3) the scrubbing solution is not highly corrosive and metallurgy problems are minimized; (4) the amount of catalyst lost during the operation of the process is inconsequential; (5) a minimum amount of water is evaporated in the regeneration section; (6) the ultimate yield of elemental sulfur is quite high; and (7) the requirement of the process for water is minimized through the use of recycle streams.

It is, accordingly, a principal object of the present invention to provide a new process for removing $H_2S$ from a gas stream with an ammoniacal solution. Another object is to provide a simple technique for removing $H_2S$ from a gas stream with an ammoniacal solution with subsequent recovery of elemental sulfur. Yet another object is to provide a process for scrubbing $H_2S$ from the gas stream which is relatively simple, effective, and economical because the reagents used are recovered and continuously recycled.

In brief summary, the present invention is a continuous, closed loop process for treating a gas stream containing $H_2S$ and for producing elemental sulfur therefrom. In the first step of the process the gas stream is introduced into the lower region of a first gas scrubbing zone which is typically a vertically positioned tower containing suitable means for achieving intimate contact between a gas stream and a water stream. Similarly, a first recycle water stream containing $NH_4OH$ is introduced into the middle region of the first scrubbing zone and a second recycle water stream which is substantially free of ammonia and sulfide is introduced into the first scrubbing zone at a point above the point of introduction of the first recycle stream. The first scrubbing zone is maintained under countercurrent liquid-gas contact conditions selected to produce a gaseous overhead stream which is substantially reduced in $H_2S$ content and is substantially free of $NH_3$ and an aqueous bottom stream containing $NH_4HS$ and typically some $NH_4OH$. In the next step, the aqueous bottom stream from the scrubbing zone, an air stream, and a third recycle water stream containing $NH_4HS$, $(NH_4)_2S_2O_3$, and $NH_4OH$ are contacted with a solid catalyst at oxidizing conditions selected to form an effluent stream containing ammonium polysulfide, $(NH_4)_2S_2O_3NH_4OH$, $H_2O$, $N_2$ and typically some unreacted $NH_4HS$. The effluent stream from this oxidation step is then separated into the gas stream containing $N_2$, $H_2O$, $H_2S$, and $NH_3$, and a liquid stream containing ammonium polysulfide, $NH_4OH$, $H_2O$, $(NH_4)_2S_2O_3$, and typically some $NH_4HS$. Following this gas-liquid separation step, the liquid stream recovered therefrom is subjected to polysulfide decomposition conditions effective to produce an overhead vapor stream containing $NH_3$, $H_2S$, and $H_2O$ and an aqueous bottom stream containing elemental sulfur and $(NH_4)_2S_2O_3$. Thereafter, sulfur is separated from this last bottom stream to form a water stream containing a minor amount of $(NH_4)_2S_2O_3$ which stream is substantially free of ammonia and sulfide. A first portion of the water stream from the sulfur separation step is then used in a second scrubbing zone to remove $H_2S$ and $NH_3$ from the gas stream produced in the gas-liquid separation step to form a nitrogen-rich overhead gas stream and an aqueous bottom stream containing $(NH_4)_2S_2O_3NH_4OH$ and $NH_4HS$. In the next step, the overhead vapor stream from the polysulfide decomposition step is introduced into a third scrubbing zone which is operated under reflux conditions selected to form a substantially sulfide-free overhead vapor stream containing $NH_3$ and $H_2O$ and an aqueous bottom stream containing $NH_4HS$ and $NH_4OH$. Thereafter, at least a portion of the overhead stream from the third scrubbing zone is condensed to form a substantially sulfide-free ammoniacal water stream, a first portion of which is returned to the third scrubbing zone as reflux. The bottom streams from the second and third scrubbing zones are then combined to form the third recycle water stream which is then passed to the oxidation step. In addition, a second portion of the water stream from the sulfur separation step is recovered as the second recycle water stream and passed to the first scrubbing zone. The first recycle water stream is then recovered as a second portion of the ammoniacal water stream formed in the overhead vapor condensing step, and the resulting stream is passed to the first scrubbing zone. And in the final step, a third portion of the water stream from the sulfur separation step is withdrawn from the process in order to remove the net amount of $(NH_4)_2S_2O_3$ formed therein.

Other embodiments and objects of the present invention encompass details about particular input streams, output streams, and the mechanics associated with each of the essential and preferred steps thereof. These are hereinafter disclosed in the following detailed discussion of these facets of the present invention.

The invention will be further described with reference to the attached drawing which is a schematic outline of the process under discussion. The attached drawing is merely intended as a general representation of a preferred flow scheme with no intent to give details about vessels, heaters, condensers, pumps, compressors, valves, process control equipment, etc., except where a knowledge of these devices is essential to the understanding of the present invention or would not be self-evident to one skilled in the art.

Referring now to the attached drawing, a gas stream containing $H_2S$ enters the process through line 1 and is charged to the lower region of the first scrubbing zone, zone 2. The gas stream may be derived from a number of different sources and may be a coal gas, or oil gas, a water gas, a natural gas, a refinery gas and the like gas streams. In order to avoid confusion, some of the various types of gas streams which can be charged to this process are defined as follows: (1) coal gas is a mixture of gases produced by the destructive distillation of coal;

(2) an oil gas is a gas derived from petroleum by the interaction of oil vapors and steam at high temperatures; (3) a water gas, or a synthesis gas, as it is sometimes called, is a gas made by decomposing steam by passing it over a bed of incandescent coke or coal, and in some cases it is made by the high temperature reduction of steam with natural gases or similar hydrocarbons; (4) a natural gas is a mixture of low molecular weight paraffin hydrocarbons — typically $C_1$–$C_4$; and, (5) a refinery gas is a mixture of low molecular weight hydrocarbon gases and/or hydrogen produced in converting and distilling hydrocarbons, In all cases, the gas stream to be treated by the present invention will contain $H_2S$ in an amount ranging from about 0.01 mole percent up to about 50 mole percent or more. Typically, the amount of $H_2S$ contained in this gas stream will be about 1 to about 15 mole percent. In addition, in some cases the gas stream may contain ammonia, and in this case the present invention will also substantially remove and recover the ammonia from the gas stream.

Zone 2 is preferably a vertically positioned tower containing suitable means for achieving intimate contact between a gas stream and a liquid stream. Suitable contacting means are trays, plates, baffles or any suitable packing material such as Raschig rings. Zone 2 is conveniently divided into three regions; a bottom region where the input gas stream enters; a middle region where a first recycle water stream enters, and a top region where a second recycle water stream is injected. The input gas stream is charged via line 1 to the bottom region of zone 2 where it intimately contacts a descending water stream which is a mixture of the first recycle water stream, which is injected via line 26, and a second recycle water stream, which enters zone 2 by means of line 21. As indicated hereinbefore, it is an essential feature of the present invention that the first recycle water stream contains $NH_4OH$ and that the second recycle water stream is substantially free of $NH_4OH$. The amount of $NH_4OH$ contained in the first recycle water stream may range from about 1 wt. percent up to about 50 wt. percent. In general, it is necessary to inject sufficient $NH_3$ via line 26 to provide at least 1 mole of $NH_3$ per mole of $H_2S$ entering zone 2 via line 1, and, more preferably, about 1 to about 5 or more moles of $NH_3$ per mole of $H_2S$. Accordingly, for a particular $H_2S$ loading on zone 2, the $NH_4OH$ concentration in the first recycle water stream, its rate of circulation and operating conditions in zone 2 are selected to provide a $NH_3/H_2S$ mole ratio within the specified range and to reduce the $H_2S$ content of treated gas stream to the desired low level which typically is of the order of 10 to 500 vol. ppm.

In the upper region of zone 2 the partially scrubbed gas stream is countercurrently contacted with the second recycle water stream under conditions designed to remove substantially all volatilized $NH_3$ from the gas stream. This second recycle water stream is substantially free of $NH_3$ — typically less than 300 wt. ppm. — because it is recovered from the bottom stream from the polysulfide decomposition zone as is explained hereinafter. The rate of circulation of this second recycle water stream is generally conveniently selected for a particular input gas stream and $NH_3/H_2S$ loading on the basis of a simple experiment designed to determine the amount required to keep the treated gas stream withdrawn from the top of zone 2 substantially free of $NH_3$. Generally, good results are obtained when the amount of the second recycle water stream is about 1 to about 10 times the amount of the first recycle water stream in a volume basis, with a preferred value being selected from the range of about 1.5:1 to about 4:1.

Regarding the scrubbing conditions utilized in zone 2, it is preferred to operate this zone at a relatively low temperature and relatively high pressure. Typcially, good results are obtained at a temperature of 50° F. to about 150° F. and a pressure ranging from about 1 to about 500 atmospheres. For example, excellent results are obtained at a temperature of about 70° F. and a pressure of about 10 atmospheres.

Following contact of the gas stream with the two recycle water streams, a treated gas stream is withdrawn from the upper region of zone 2 by means of line 3. Similarly, an aqueous bottom stream containing $NH_4HS$ and typically some $NH_4OH$ is withdrawn from the bottom region thereof via line 4. Although it is not essential, in some cases where very dilute gas streams are being treated in zone 2, the bottom stream therefrom may be advantageously further treated to concentrate the $NH_4HS$ contained therein to yield a water stream containing about 3 to 15 wt. percent as $NH_4HS$. Generally, this concentration step can be easily effected by stripping $NH_3$ and $H_2S$ therefrom and redissolving the resulting gas stream in the required quantity of water or by recirculating at least a portion of this bottom stream around the lower region of zone 2. However, in most cases the amount of $NH_4HS$ contained in the bottom stream is sufficient to allow the direct passage of it to treatment zone 6 as is shown in the drawing. This is especially true when the amount of unreacted sulfide recycled to zone 6 via lines 11 and 12 is sufficient to increase the concentration of sulfide in the combined water stream charged to zone 6 to about 3 to 15 wt. percent thereof.

Accordingly, in the embodiment disclosed in the drawing, the aqueous bottom stream from zone 2 is passed via line 4 to the junction of line 5 with line 4 where it is commingled with an air stream, and the resulting mixture passed to treatment zone 6. The amount of oxygen contained in this air stream is selected so that ammonium polysulfide is formed within zone 6. In order to effect the polysulfide formation in zone 6, the amount of oxygen injected into this zone must be carefully regulated so that oxygen is reacted therein in an amount less than the stoichiometric amount required to oxidize all of the ammonium sulfide salt charged to this zone to elemental sulfur. Since the stoichiometric amount of oxygen is 0.5 mole of oxygen per mole of sulfide, it is essential that the amount of oxygen charged to the treatment zone is sufficient to react less than 0.5 mole of sulfide, and, preferably, about 0.25 to about 0.45 moles of oxygen per mole of sulfide salt. It is especially preferred to operate with an amount of oxygen sufficient to react about 0.4 mole of oxygen per mole of sulfide charged to this zone. Accordingly, the amount of oxygen, charged to zone 6 via lines 5 and 4, is selected such that sufficient unreacted sulfide remains available to form a water-soluble ammonium polysulfide with the elemental sulfur which is the product of the primary oxidation reaction. Since 1 mole of sulfide will react with many atoms of sulfur (for ammonium polysulfide, it is typcially about four atoms of sulfur per mole of sulfide), it is generally only necessary that a small amount of sulfide remain unoxidized.

According to the present invention, the aqueous bottom stream from zone 2 is passed to zone 6 wherein it is catalytically treated with oxygen at oxidizing conditions selected to produce an effluent stream containing ammonium polysulfide, $NH_4OH$, $(NH_4)_2S_2O_3$, $H_2O$, $N_2$, and typically some unreacted $NH_4HS$. A feature of the present invention is the commingling of the water stream feed to this oxidation step with a third recycle water stream containing unreacted sulfide recovered from the effluent stream from treatment zone 6. This third recycle water stream may be commingled with the aqueous bottom stream from zone 2 prior ot its being passed into the treatment zone; on the other hand, this recycle water stream can be injected into the treatment zone at a plurality of injection points spaced along the direction of flow of the bottom stream through the treatment zone as is shown in the attached drawing where the third recycle water stream enters zone 6 via lines 11 and 12. The principal advantage of this latter procedure is that the recycle stream acts as a quench stream for the exothermic reactions taking place within the treatment zone. Another advantage associated with use of the third recycle water stream is that the concentration of $NH_4HS$ charged to the treatment zone is increased. Since it has been determined that the selectivity of the oxidation reaction for elemental sulfur increases with the concentration of sulfide charged to the oxidation step, the presence of sulfide in the recycle stream can be used to increase the selectivity for sulfur of the treatment zone. In fact, it is a preferred procedure to use the third recycle water stream to maintain the concentration of ammonium hydrosulfide in the combined water stream charged to zone 6 at about 3 to about 15 wt. percent calculated as elemental sulfur.

The catalyst utilized in treatment zone 6 is any suitable solid catalyst that is capable of accelerating the oxidation of ammonium hydrosulfide to elemental sulfur. Two particularly preferred classes of catalyst for this step are metallic sulfides, particularly iron group metallic sulfides, and metal phthalocyanines.

The preferred metallic sulfide catalyst is selected from the group consisting of the sulfides of nickel, cobalt, and iron, with nickel sulfide being especially preferred. Although it is possible to perform this oxidation step with a slurry of metallic sulfide particles, it is preferred that the metallic sulfide be combined with a suitable carrier material. Examples of suitable carrier materials are: charcoals, such as wood charcoal, bone charcoal, etc., which charcoals may or may not be activated prior to use; refractory inorganic oxides such as alumina, silica, zirconia, bauxite, etc.; activated carbons such as those commerically available under trade names of Norit, Nuchar, and Darco and other similar carbon materials familiar to those skilled in the art. In addition, other natural or synthetic highly porous inorganic carrier materials such as various forms of clay, kieselguhr, etc., may be used if desired. The preferred carrier materials for the metallic sulfide catalyst are alumina, particularly alpha-, gamm-, and eta-alumina, and activated charcoal. Thus, nickel sulfide combined with alumina or nickel sulfide combined with activated carbon are particularly preferred catalysts for the oxidation step. In general, the metallic sulfide is preferably combined with the carrier material in amounts sufficient to result in a final composite containing about 0.1 to about 30 or more wt. percent of the metallic component, calculated as the elemental metal. For the preferred nickel sulfide catalyst, excellent results are obtained with about 1 to about 15 wt. percent nickel as nickel sulfide on an activated carbon support or on an alumina support.

An especially preferred catalyst for use in the treatment zone 6 is a metal phthalocyanine compound combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine may be employed including the sulfonated derivatives and the carboxylated derivatives. Any of the carrier materials previously mentioned in connection with the metallic sulfide catalysts can be utilized with the phthalocyanine compound; however, the preferred carrier material is activated carbon. Hence, a particularly preferred catalyst for use in the oxidation step comprises a cobalt or vanadium phthalocyanine sulfonate combined with an activated carbon carrier material. Additional details as to alternative carrier materials, methods of preparation, and the preferred amounts of catalytic components are given in the teachings of U.S. Pat. NO. 3,108,081 for these phthalocyanine catalysts.

Although the operation of zone 6 can be performed according to any of the methods taught in the art for simultaneously contacting a liquid stream and a gas stream with a solid catalyst, the preferred procedure involves a fixed bed of the solid catalyst disposed in the treatment zone. The aqueous bottom stream from zone 2 is then passed therethrough in either upward, radial, or downward flow and the air stream is charged in either concurrent or countercurrent flow relative to the water stream. The preferred procedure is to operate downflow with both streams being charged in concurrent fashion. Because one of the products of this oxidation step is elemental sulfur, there is a substantial catalyst contamination problem caused by the deposition of this elemental sulfur on the fixed bed of the catalyst. In order to avoid sulfur desposition on the catalyst, it is necessary to operate so that the net sulfur made in this zone is reacted with excess sulfide to form a water-soluble ammonium polysulfide.

Regarding the conditions utilized in treatment zone 6, it is preferred to utilize a temperature in the range of about 75 to about 200° F., with a temperature of about 100° to about 175° F. yielding best results. The sulfide oxidation reaction is not too sensitive to pressure, and, accordingly, any pressure which maintains the water stream charged to zone 6 substantially in the liquid phase may be utilized. In general, it is preferred to operate at the lowest possible pressure which is sufficient to maintain the elemental sulfur in combination as the water-soluble ammonium polysulfide, and although pressures of about 1 to about 30 psig. may be used, a pressure of about 1 to about 20 psig. is particularly preferred. Additionally, it is preferred to operate on the basis of a combined stream liquid hourly space velocity which is defined as the volume charge rate per hour of the aqueous bottom stream from zone 2 plus the third recycle water stream divided by a total volume of the catalyst bed. This parameter is preferably selected from the range of about 0.6 to about 20 hr.$^{-1}$, with a value of about 1 to about 10 hr.$^{-1}$ giving best results.

An effluent stream is then withdrawn from zone 6 and found to contain ammonium polysulfide, $NH_4OH$, $(NH_4)_2S_2O_3$ $H_2O$, $N_2$ in many cases unreacted $NH_4HS$, and typically unreacted $O_2$. This stream is passed via line 7 to gas-liquid separating zone 8 and therein separated into a gas stream containing $N_2$, $H_2O$, $H_2S$, $NH_3$, and typically unreacted $O_2$ and a water stream containing ammonium polysulfide, $NH_4OH$, $(NH_4)_2S_2O_3$, and typcially some unreacted $NH_4HS$. This separation step is preferably performed at approximately the temperature and pressure maintained at the outlet from the oxidation step.

The water stream from separation zone 8 is then passed via line 13 to polysulfide decomposition zone 14. In this zone, the ammonium polysulfide is decomposed to yield $NH_3$, $H_2S$, and elemental sulfur. Although the polysulfide can be decomposed according to any of the methods taught in the art, the preferred procedure involves subjecting it to conditions, including a temperature in the range of about 200° F. to about 350° F. and a pressure of about 1 to about 75 psig., sufficient to form an overhead vapor stream containing $NH_3$, $H_2S$, $H_2O$ which is withdrawn from zone 14 via line 15 and an aqueous bottom stream containing elemental sulfur and a minor amount of $(NH_4)_2S_2O_3$ which is withdrawn via line 18. In many cases, it is advantageous to accelerate the polysulfide decomposition reaction by stripping $H_2S$ and $NH_3$ from the polysulfide solution with the aid of a suitable inert gas such as steam, nitrogen, air, flue gas, etc. which can be injected into the bottom of the decomposition zone. Moreover, upflowing vapors may be generated in situ by supplying heat to the bottom of zone 14 by means such as a steam coil or reboiler in order to accelerate the decomposition reaction.

When the temperature utilized in the bottom of decomposition zone 14 is less than the melting point of sulfur, the elemental sulfur will be present in the form of a slurry of solid particles in the aqueous bottom stream from zone 14. This slurry-containing bottom stream is then subjected, in sulfur recovery zone 19, to any of the techniques taught in the art for removing a solid from a liquid such as filtration, settling, centrifuging, etc., to remove the elemental sulfur therefrom and to form a treated water stream containing a minor amount of $(NH_4)_2S_2O_3$. In the case where the decomposition temperature utilized in zone 14 is greater than the melting point of sulfur, the bottom water stream from zone 14 will contain a dispersion of liquid sulfur in the aqueous stream, and this mixture can be passed to sulfur recovery zone 19 wherein the liquid sulfur can be allowed to settle out and form a separate liquid sulfur phase. In this last case, the separation of the elemental sulfur from the treated water stream can be performed, if desired, within the decomposition zone by allowing the liquid sulfur to collect at the bottom of this zone and separately drawing off the treated water stream and a liquid sulfur stream. This last mode of operation is facilitated by the relatively rapid rate that liquid sulfur will separate from the water stream. In the attached drawing, the separation of sulfur is accomplished in sulfur recovery zone 19 to which the bottom stream from zone 14 is charged via line 18 and from which a sulfur stream is with-drawn via line 20 and a water stream is recovered via line 21. This last stream is substantially free of ammonia and hydrogen sulfide because of the stripping conditions it experienced in zone 14. Likewise, it is substantially free of sulfide salts (generally sulfide is less than 1,000 ppm. of this stream) and contains only a relatively minor amount of ammonium thiosulfate; typically, about 0.1 to about 20 wt. percent ammonium thiosulfate calculated as elemental sulfur, the exact value within this range being dependent on the amount of thiosulfate removed from the system via line 27.

A first portion of the water stream from zone 19 is charged via lines 21 and 22 to second scrubbing zone 10 where it counter-currently contacts the gas stream from gas-liquid separating zone 8 which enters zone 10 via line 9. Zone 10 is typically a vertically positioned tower containing suitable contacting means for achieving intimate contact between the gas and liquid streams. This zone is usually operated at a temperature which is relativley lower than that used in separation zone 8. Likewise, the pressure used is a relatively low pressure corresponding to that utilized in zone 8 and is preferably about 1 to about 10 psig. Normally, intimate contact between the gas stream and the liquid stream is effected at a liquid to gas loading sufficient to produce an overhead stream which is substantially free of $NH_3$ and $H_2S$. A nitrogen-rich overhead gas stream exits from zone 10 near the top thereof via line 24, and is vented from the system. Similarly, an aqueous bottom stream containing $NH_4HS$, $NH_4OH$, and $(NH_4)_2S_2O_3$ is withdrawn near the bottom of the zone 10 via line 11. The aqueous stream withdrawn via line 11 contains substantially all of the hydrogen sulfide an ammonia which is flashed off in separating zone 8.

In the third scrubbing zone, zone 16, the overhead vapor stream from polysulfide decomposition zone 14, which is charged to the lower region of zone 16 via line 15, is countercurrently contacted with an ammoniacal water stream formed by condensing a portion of the overhead vapor from zone 16 and returning a portion of the resulting condensate to zone 16 as reflux. Zone 16 is preferably operated at a pressure corresponding to that maintained at the outlet from zone 14; for example, good results are obtained at a pressure of about 30 to about 90 psig. Similarly, this third scrubbing zone is preferably operated at a bottom temperature which is lower than that maintained at the top of zone 14; for example, a temperature of about 250° to about 350° F. Zone 16 is also operated at a liquid gas loading sufficient to produce an overhead vapor stream comtaining $NH_3$ and $H_2O$ which is substantially free of sulfide, and an aqueous bottom stream containing $NH_4OH$ and $NH_4HS$. The overhead vapor stream is withdrawn from zone 16 via line 25; thereafter, at least a portion of it is condensed by suitable condensing means (not shown) to form a substantially sulfide-free ammoniacal aqueous stream, and a first portion of the resulting liquid condensate stream is passed to third scrubbing zone via lines 26 and 23 as reflux. The temperature of this reflux stream should be relatively low as compared to the temperature maintained in the bottom of zone 16 — for example, where the bottom of zone 16 is maintained at 300° F. and a pressure of about 60 psig., a good reflux temperature is 100° F. The aqueous bottom stream from zone 16 is withdrawn therefrom via line 17. It is to be noted that in the case where the gas stream entering the process via line 1 contains $NH_3$, a portion of the overhead vapor stream from zone 16 can be withdrawn from the system via line 25 in order to prevent the build-up of $NH_3$ in the system. This drag stream is preferably recovered after a portion of the overhead vapor in line 25 is condensed because subjecting this vapor stream to a partial condensation step acts to purify the $NH_3$ vapor stream recovered via line 25.

The second portion of the ammoniacal water stream formed by condensing at least a portion of the overhead vapor stream from zone 16 is then passed via line 26 back to the first scrubbing zone as the first recycle water stream. In the case where $NH_3$ is not present in the input gas stream to zone 2, line 25 is blocked-off and essentially all of the overhead vapor stream zone 16 is condensed and used as reflux or as the first recycle water stream. In this last case, it is necessary to add makeup $NH_3$ or $NH_4OH$ via line 29 to compensate for the inevitable small losses of $NH_3$ from the system in vent gas streams and in by-products.

A second portion of the water stream recovered from the sulfur separating step performed in zone 19 is then passed via line 21 to the upper region of zone 2 as the second recycle water stream. As previously explained, the principal function of this second recycle stream is to scrub $NH_3$ from the treated gas stream. Of course it is understood that a third portion of the water stream recovered from zone 19 may be withdrawn from the system via line 27, either on a continuous or intermittent basis, in order to remove the net amount of $(NH_4)_2S_2O_3$ formed in the process.

The third portion of the water stream recovered from the sulfur-separation step occurring in zone 19, which is withdrawn from the system via line 27, will also contain at least a portion of the water formed by the oxidation reaction occurring in zone 6. In the case where the input gas stream, entering the system via line 1, and/or the input air stream, which enters via line 5, are not saturated with water, a portion of the water product will be withdrawn from the system via lines 3 and 24. Likewise, some water may be withdrawn via line 25 is an $NH_3$ product stream is made. In some cases, $H_2O$ losses via the vent gas stream and the $(NH_4)_2S_2O_3$ drag stream may be greater than the water produced in the oxidation step; in this case makeup water is added to the system via line 28.

In this connection it should be noted that during startup of the present process, a supply of ammoniacal solution is introduced into the system via line 29 and a supply of sulfide and ammonia-free water via line 28. After the system is linedout these two input ports are then used to supply makeup solutions in the manner previously explained.

A preferred mode of operation of the polysulfide decomposition step and the third scrubbing step is to locate zone 16 on top of zone 14 in "piggy-back" fashion. These two zones can then be contained in a single fractionation column with suitable baffles or plates or other means used to divide the column into the two zones.

Returning to the bottom water streams from scrubbing zones 10 and 16, these streams are combined at the junction of line 17 with line 11 to form the third recycle water stream. The resulting mixture is cooled by a suitable cooling means (not shown) to a temperature of about 50° to about 125° F. and passed via lines 11 and 12 back to treatment zone 6 as previously explained. The purpose of the two scrubbing operations is to recapture the unreacted sulfide contained in the effluent from the oxidation step in order to prevent pollution problems that could be caused by the indiscriminate disposal of this unreacted sulfide, and to increase the yield of elemental sulfur recovered via line 20.

Typical results obtained with the respect process are (1) a conversion of sulfide in zone 6 of about 60 to 90 percent at a selectivity of elemental sulfur at 80 to 99% (on a per pass basis), an (2) an overall conversion of about 85 to about 99 percent of the entering hydrogen sulfide to elemental sulfur recovered via line 20.

It is intended to cover by the following claims, all changes and modifications of the above disclosure of the present invention which would be self-evident to a man of ordinary skill in the gas treating art.

I claim as my invention:

1. A continuous closed-loop process for scrubbing $H_2S$ from a gas stream containing same and for producing elemental sulfur therefrom, said process comprising the steps of:

1. introducing said gas stream into the lower region of a first gas scrubbing zone, introducing a first recycle water stream containing $NH_4OH$ into the middle region of the first scrubbing zone, and introducing a second recycle water stream which is substantially free of ammonia and sulfide into the first scrubbing zone at a point above the point of introduction of said first recycle stream;

2. maintaining said first scrubbing zone under counter-current gas-liquid contact conditions selected to produce a gaseous overhead stream which is substantially reduced in $H_2S$ content and is substantially free of $NH_3$, and an aqueous bottom stream containing $NH_4HS$;

3. reacting at least a portion of the aqueous bottom stream from step (2), and air stream, and a third recycle water stream containing $(NH_4)_2S_2O_3$, $NH_4OH$, and $NH_4HS$ with a solid catalyst at oxidizing conditions selected to form an effluent stream containing ammonium polysulfide, $(NH_4)_2S_2O_3$, $NH_4OH$, $H_2O$ and $N_2$;

4. separating the effluent stream from step (3) into a gas stream containing $N_2$, $H_2O$, $H_2S$, and $NH_3$, and a liquid stream containing ammonium polysulfide, $NH_4OH$, $H_2O$ and $(NH_4)_2S_2O_3$;

5. subjecting the liquid stream from step (4) to polysulfide decomposition conditions effective to produce an overhead vapor stream containing $NH_3$, $H_2S$, and $H_2O$, and an aqueous bottom stream containing elemental sulfur and $(NH_4)_2S_2O_3$;

6. separating sulfur from the bottom stream from step (5) to form a water stream containing a minor amount of $(NH_4)_2S_2O_3$, which stream is substantially free of ammonia and sulfide;

7. contacting a first portion of the water stream from step (6) with the gas stream from step (4), in a second scrubbing zone, at countercurrent gas-liquid contact conditions selected to form a nitrogen-rich overhead gas stream and an aqueous bottom stream containing $NH_4OH$, $(NH_4)_2S_2O_3$, and $NH_4HS$;

8. introducing the overhead vapor stream from step (5) into a third scrubbing zone and operating the third scrubbing zone under reflux conditions selected to form a substantially sulfide-free overhead vapor stream containing $NH_3$ and $H_2O$ and an aqueous bottom stream containing $NH_4HS$ and $NH_4OH$;

9. condensing at least a portion of the overhead vapor stream from step (8) to form substantially sulfide-free ammoniacal water steam and returning a first portion of the resulting water stream to step (8) as reflux;

10. combining the bottom stream from step (7) and the bottom stream from step (8) to form said third recycle water stream and passing same to step (3);

11. recovering a second portion of the water stream from step (6) as said second recycle water stream and passing same to step (1);

12. withdrawing a third portion of the water stream produced in step (6) from the process in order to remove the net amount of $(NH_4)_2S_2O_3$ formed in the process; and 13. passing a second poriton of the ammoniacal water stream formed in step (9) to step (1) as the first recycle water stream.

2. A process as defined in claim 1 wherein the gas stream charged to step (1) contains $H_2S$ and $NH_3$ and wherein a portion of the overhead vapor stream from step (8) is withdrawn from the process as an ammoniacal product stream.

3. A process as defined in claim 1 wherein the solid catalyst utilized in step (3) is a phthalocyanine compound.

4. A process as defined in claim 1 wherein the solid catalyst utilized in step (3) comprises an iron group metallic sulfide combined with a carrier material.

5. A process as defined in claim 1 wherein the amount of air charged to step (3) is sufficient to react about 0.4 moles of oxygen per mole of sulfide charged to said step.

6. A process as defined in claim 1 wherein said solid catalyst utilized in step (3) is cobalt phthalocyanine monosulfonate combined with an activated carbon carrier material.

7. A process as defined in claim 1 wherein said gas stream charged to step (1) is a coal gas containing $H_2S$.

8. A process as defined in claim 1 wherein said gas stream charged to step (1) is a water gas or a synthesis gas containing $H_2S$.

9. A process as defined in claim 1 wherein said gas stream charged to step (1) is a natural gas containing $H_2S$.

10. A process as defined in claim 1 wherein said gas stream charged to step (1) is a refinery gas containing $H_2S$.

11. A process as defined as in claim 1 wherein the oxidizing conditions utilized in step (3) include a temperature of about 75° to about 200° F. and a pressure of about 1 to about 30 psig.

* * * * *